Feb. 11, 1969

M. BIRNBAUM 3,427,565

LASER ARRANGEMENT

Filed Jan. 18, 1963

MILTON BIRNBAUM
INVENTOR.

BY Don Finkelstein

ATTORNEY

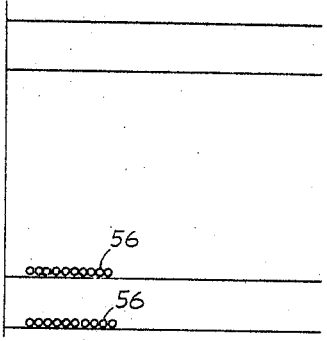
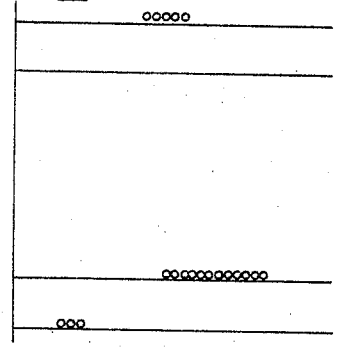
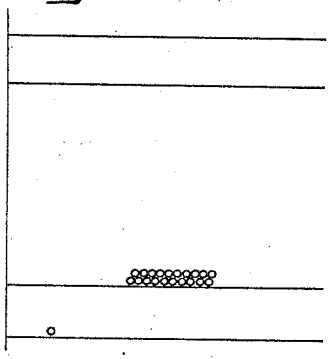
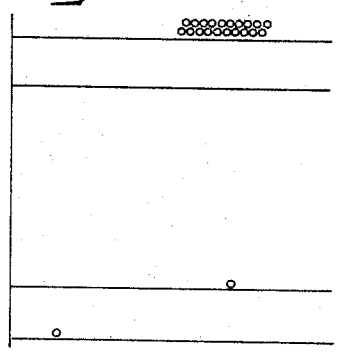
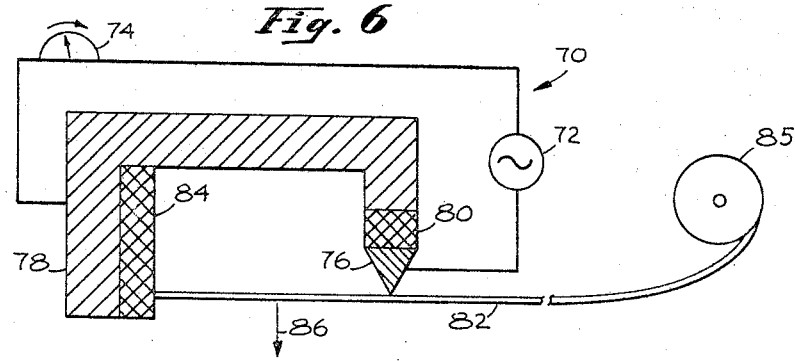
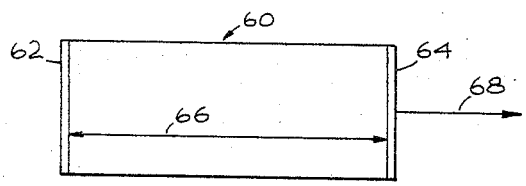

3,427,565
LASER ARRANGEMENT
Milton Birnbaum, Palos Verdes, Calif., assignor to The Aerospace Corporation, Los Angeles, Calif., a corporation of California
Filed Jan. 18, 1963, Ser. No. 252,433
U.S. Cl. 331—94.5                                    24 Claims
Int. Cl. H01s 3/00

---

This invention relates to the laser art and more particularly to an improved arrangement for providing a pulsed laser beam.

In many applications it is desirable to produce a beam of coherent electromagnetic radiation having energy substantially concentrated in a particular wavelength. One type of device capable of generating such a beam of electromagnetic radiation is generally termed a laser which is an acronym for "light amplification by stimulated emission of radiation." It is often desirable to have the emission from a laser in wavelengths in the near and far ultraviolet, visible or infrared portions of the electromagnetic radiation spectrum, as well as the infrared portion.

However, lasers utilized in the past have generally been limited in their laser emission to electromagnetic radiation having energy in wavelengths associated with particular materials compatible with the known laser techniques, and these emissions were generally in the infrared portion. The laser structures and methods of operation utilized heretofore have generally not permitted utilization of materials from which laser emission in other wavelengths was available.

Therefore, to obtain laser outputs in these desired wavelengths, it is necessary to provide an improved laser structure and an improved laser operating technique so as to make available for laser operation materials having outputs of electromagnetic radiation in the desired wavelengths.

These desiderata are achieved, according to one embodiment of applicant's invention herein, by selecting as a laser material an optically orientable medium having in its quantum energy structure certain preselected allowable quantum energy levels and certain preselected time constants associated with the energy transitions between the preselected energy levels.

In this embodiment the optically orientable medium is contained within a laser cell and is maintained therein in the gaseous state at a preselected temperature and pressure.

The optically orientable medium may be considered to be comprised of a plurality of atoms, in this embodiment, and the atoms are subjected to preselected wavelengths of electromagnetic radiation to induce laser emission therefrom.

The laser cell itself comprises a tube-like member having cylindrical wall portions transparent to preselected wavelengths of electromagnetic radiation and a pair of parallel oppositely-disposed end wall portions that are internally reflective of at least one preselected wavelength of electromagnetic radiation, and a section of one of the reflecting wall portions is at least partially transparent to this one preselected wavelength of electromagnetic radiation to allow emission thereof from the laser cell through the end portion.

The atoms of the optically orientable medium are subjected to a first stage of optical pumping by an optical pumping light beam that induces energy transitions of the atoms from a first of two quantum energy levels at the ground energy state up to quantum energy levels in a first optically excited state. The optical pumping light beam contains energy in a wavelength corresponding to this energy separation and, in addition, is circularly polarized. As a result, virtually all the atoms originally in the first energy level of the ground state are pumped up to the energy levels of the first optically excited state. From this energy state the atoms spontaneously decay down to either energy level of the ground state and thus most of the atoms comprising the medium are ultimately aligned in the second energy level of the ground state. The first stage of optical pumping, as described above, achieves this alignment by this two-step process of first pumping up and then allowing spontaneous decay of the atoms between preselected energy levels.

The time constant for energy transitions between the two energy levels of the ground state is slow in comparison with the optical pumping time.

The aligned atoms of the medium are cyclically subjected to a second stage of optical pumping which comprises an intense beam of trigger light electromagnetic radiation containing energy in the same wavelength as the optical pumping light beam, but the trigger light beam is either plane polarized or unpolarized, but cannot be circularly polarized. This intense trigger light beam induces substantially simultaneous transitions of the aligned atoms out of the second energy level of the ground state back up to the energy levels of the first excited state. This results in a sudden population inversion of the atoms in the energy levels of the first excited state with respect to the first energy level of the ground state and the atoms commence a spontaneous energy transition therebetween. The pumping time with the trigger light beam in this second stage of optical pumping must be of the same order of magnitude as this spontaneous decay time.

As the atoms undergo this second spontaneous decay, electromagnetic radiation having a wavelength equivalent to the energy separation therebetween (which is the same wavelength as in the optical pumping light beam and the trigger light beam) is emitted and part of that radiation is reflected back and forth between the reflective end wall portions of the laser cell. This induces the stimulated emission of electromagnetic radiation at this wavelength in a coherent beam through the partially transparent section of the reflective wall portion of the laser cell and comprises the desired laser output.

Laser action ceases when a sufficient number of atoms accumulate in the first energy level of the ground state to make the necessary population inversion necessary for laser action impossible. The irradiation of the medium by the trigger light beam is cyclically terminated and the above-described two stage optical pumping operating procedure is repeated to provide a pulsed laser beam.

In other embodiments of applicant's invention, a solid rather than a gaseous state optically orientable medium is utilized to provide the emission of a pulsed laser beam.

These and other embodiments are more fully described in the following detailed specification taken together with the accompanying drawings wherein similar reference characters refer to similar elements and in which:

FIGURES 3 and 4 are diagrammatic representations of the operational procedure associated with the operation of the embodiment shown in FIGURE 2;

FIGURE 5 is a schematic representation of another embodiment of applicant's invention; and FIGURE 6 is a schematic representation of still another embodiment of applicant's invention.

Before detailing a description of applicant's improved laser and the structure associated with this invention herein, applicant first presents a brief discussion of the fundamental, physical concepts underlying applicant's invention in order that the operation of applicant's improved laser may be better understood.

Figure 1:
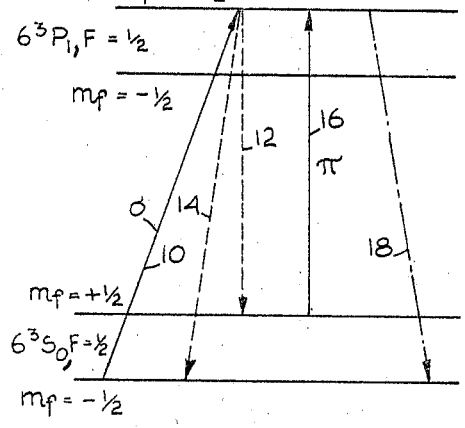
FIGURE 1 is a diagrammatic representation of the energy levels associated with an optically orientable medium that may be utilized in applicant's invention herein.

Applicant utilizes as his medium, from which the laser beam is emitted, an optically orientable medium that has certain physical characteristics. One medium that applicant has found to possess these characteristics is the isotope 199 of mercury. Referring to FIGURE 1, there is shown a diagrammatic representation of a portion of the allowable quantum levels of mercury 199. Since mercury 199 has a quantum nuclear spin magnetic moment of ½, both the ground state $6^3S_0$, ($S_0$), and the first optically excited state $6^3P_1$, ($P_1$), have an energy level equivalent to $F=½$, which will degenerate into two quantum magnetic substates: $m_f=±½$. This is comparatively uncomplicated quantum energy level structure and consequently has been chosen for illustration of the physical principles involved in applicant's invention. However, it is to be understood that the utilization of mercury 199 as an illustrative optically orientable medium is not to be construed as limiting applicant's invention to mercury 199; rather, as discussed below, there are many other optically orientable mediums that may be utilized in applicant's invention.

If a collection of atoms of mercury 199 in the gaseous state is subjected to a pumping light beam of electromagnetic radiation that contains energy in a wavelength equivalent to 2537 angstroms, which is equivalent to the separation between the $S_0$ ground state and the $P_1$ first optically excited state, and the electromagnetic radiation of this wavelength is circularly polarized, a pumping action of the mercury atoms will occur. Since the pumping light beam is circularly polarized the selection rules are brought into play and atoms that are thus optically pumped can only gain one magnetic substate number. Since, for the two magnetic substate levels at the ground state of the mercury 199 there can only be a gain of 1 magnetic substate number by the atoms from the $m_f=-½$ going to the $m_f=+½$ magnetic substate of the $P_1$ first optically excited state, there is no net pumping from the $m_f=+½$ state of the $S_0$ ground state, since there does not exist at the $P_1$ first optically excited state a magnetic substate having a value of ⅜, which would be required for those atoms to gain one magnetic substate number.

While the separation shown on FIGURE 1 between the adjacent magnetic substates appears large in comparison with the separation between the $S_0$ ground state and the $P_1$ first optically excited state, it will be appreciated that the scale has been exaggerated merely for clarity in explaining the physical principles herein. For all practical purposes the energy separation between either of the magnetic substates at the $S_0$ ground level and either of the magnetic substates at the $P_1$ first optically excited level may be considered to be equivalent to electromagnetic radiation having a wavelength of 2537 angstroms. The differences between, for example, energy transistions from the $m_f=-½$ magnetic substate of the $S_0$ ground state and either the $m_f=-½$ or $+½$ magnetic substate of the $P_1$ first optically excited state, and the reverse energy transitions are optically unresolvable and equivalent to less than an equivalent wavelength of a megacycle or so. Also, the absolute differences in energy between magnetic substates at the $P_1$ first optically excited level is even considerably less than that above stated for the energy separation between adjacent magnetic substates at the $S_0$ ground state.

As shown on FIGURE 1, the line 10, designated σ, indicates the energy transitions of atoms of mercury 199.

As shown on FIGURE 1, the line 10, designated σ, indicates the energy transitions of atoms of mercury 199 when subjected to circularly polarized electromagnetic radiation having a wavelength of 2537 angstroms. After the atoms are pumped up to the $m_f=+½$ magnetic substate of the $P_1$ first optically excited state, they may undergo spontaneous decay back down to either the $m_f=+½$ or the $m_f=-½$ magnetic substate of the $S_0$ ground state. These spontaneous decay transitions are indicated by the dashed lines 12 and 14, respectively. However, if the circularly polarized electromagnetic radiation indicated by the line 10 continually irradiates the atoms, it will be appreciated that there will be a gradual accumulation of virtually all the atoms in the $m_f=+½$ magnetic substate of the $S_0$ ground state.

To achieve the magnetic substate differences, for some optically orientable mediums, it may be necessary to apply a weak undirectional magnetic field to induce the Zeeman splitting into the degenerate magnetic substates. However, applicant has found that for many optically orientable mediums a undirectional magnetic field to induce Zeeman splitting is not required.

The above process is generally described as optical pumping.

If the collection of mercury 199 atoms aligned into the $m_f=+½$ magnetic substate of the $S_0$ ground state by the method described above, or any other method, are subjected to unpolarized or plane polarized electromagnetic radiation having a wavelength of 2537 angstroms, π radiation, indicated on FIGURE 1 by the solid arrow 16, energy transitions of virtually all the aligned atoms are induced from the $m_f=+½$ magnetic substate of the $S_0$ ground state up to the $m_f=+½$ magnetic substate of the $P_1$ optically excited state. Further, if this beam of unpolarized or plane polarized electromagnetic radiation 16 is sufficiently intense there will be virtually instantaneous energy transition of the atoms to the $m_f=+½$ magnetic substate of the $P_1$ first optically excited state. Thus, this second stage of optical pumping, i.e., with the unpolarized or plane polarized electromagnetic radiation, induces an overpopulation condition of the $m_f=+½$ magnetic substate of the $P_1$ first optically excited state with respect to the $m_f=-½$ magnetic substate of the $S_0$ ground state.

This overpopulation condition, or population inversion, permits the laser operation if the atoms of the mercury 199 are in a suitable environment in which stimulated emission of electromagnetic radiation is induced. Details of this environment are discussed below. When this stimulated emission is induced, a coherent beam of electromagnetic radiation is emitted from the mercury 199 as the atoms undergo an energy transition from the $m_f=+½$ magnetic substate of the $P_1$ first optically excited state down to the $m_f=-½$ magnetic substate of the $S_0$ ground state. This transition is indicated by the dash-dot arrow designated 18 on FIGURE 1.

The electromagnetic radiation associated with this stimulated emission indicated by the line 18 on FIGURE 1 has a wavelength of 2537 angstroms and continues until there are sufficient atoms in the $m_f=-½$ magnetic substate of the $S_0$ ground state to overcome the required population inversion.

In addition to having similar energy structures to that described above for the illustration of mercury 199, the optically orientable media utilizable in applicant's invention herein must also possess certain time constants associated with the quantum energy transitions from various energy levels. For the first stage of optical pumping, that is, with the circularly polarized electromagnetic radiation, designated 10 on FIGURE 1, in order to achieve a substantial alignment of virtually all the particles into a magnetic substate of the ground state, it is necessary that the optical pumping time for the transition from the magnetic substate of the ground level up to a magnetic substate of a first optically excited state be short in comparison with the relaxation time between the adjacent magnetic substates at the ground level. For optically orientable media having this condition, it is possible to achieve a very high degree of orientation of the particles comprising the optically orientable medium into a preselected magnetic substate, or, depending upon the energy structure of the optically orientable medium, into a preselected energy level.

Thus, the first stage of optical pumping with the circularly polarized electromagnetic radiation may be considered to consist of two steps. The first step is the actual pumping from an energy level of the ground energy state to a first optically excited state and the second step may be considered as inducing the spontaneous decay back to an energy level of the ground state different from the one from which the particles comprising the optically orientable medium had originally been pumped. The optical pumping described above achieves both these steps with the optically orientable media that are utilized in applicant's invention herein.

In addition there are other times associated with the energy transitions described in connection with FIGURE 1 that are important in the practice of applicant's invention herein. These are that in the second stage of optical pumping, that is with the unpolarized or plane polarized electromagnetic radiation designated by the line 16 in FIGURE 1, must be on the same order of magnitude as the lifetime of the particles comprising the optically orientable medium at the excited level. This lifetime is equivalent to the spontaneous decay time indicated by the line 18 which provides the laser output. Therefore, a very intense beam of unpolarized or plane polarized electromagnetic radiation is preferably utilized so that a rapid transition of the particles from their algined condition in a magnetic substate up to the magnetic substate of the first optically excited level occurs, and during this second pumping time there is very little spontaneous decay along the line indicated by the numeral 18 on FIGURE 1. By achieving this high overpopulation condition of the magnetic substate of the first optically excited state there is a large population inversion of this state with respect to a magnetic substate of the ground state and the laser operation may be initiated at this time.

Optically orientable media that may be utilized in applicant's invention herein are thus defined as those having allowable energy levels and allowable optically inducible transitions between these allowable energy levels similar to that described above in connection with FIGURE 1, and also having the above-described time constants associated with the optically induced transitions and decays between allowable energy levels.

In addition to the isotope 199 of mercury utilized above for illustrative purposes, applicant has found that many other materials may be utilized as the optically orientable medium in applicant's invention for providing laser operation. Table I below is a listing of some of the materials that any be utilized as optically orientable media in applicant's invention herein.

*Table I.—Optically orientable media*

| Element: | Laser emission wavelength, angstroms |
|---|---|
| Hydrogen | 1215.7 |
| Lithium | 6707 |
| Sodium | 5889 |
| Potassium | 7664 |
| Rubidium | 7800 |
| Cesium | 8521 |
| Magnesium | 4571 |
| Calcium | 6573 |
| Cadmium | 3261 |
| Mercury | 2537 |

For certain of the optically orientable media listed in Table I, it may be desirable to include atoms of various buffer gases such as argon, neon or the like to inhibit wall collisions of the atoms of the optically orientable medium. Also, organic wall coating may also be employed for the same purpose.

In addition to those materials listed in Table I, which are generally utilized in applicant's invention in the gaseous state, applicant has also found that certain solids may also be utilized as well as some molecular systems. For example, the atoms arsenic and phosphorus existing as impurities in solid silicon may be utilized as optically orientable media according to applicant's invention herein. Therefore, the description of the istope 199 of mercury as utilized for illustrative purposes in this application and the inclusion of certain other elements in Table I and above, are not intended by applicant to be limiting his invention to utilization of these materials as optically orientable media. Rather, it is applicant's intention that all optically orientable media that have the physical characteristics meeting the requirements described above fall within the scope and spirit of his invention herein.

When utilizing materials other than the mercury 199 the same techniques as described above for mercury 199 may be utilized in the practice of applicant's invention; however, there will be slight variations apparent to those skilled in the art because of different hyperfine structure in the magnetic substates and different time constants of other optically orientable media.

The above physical principles are utilized in applicant's invention herein to provide a laser operation in which a pulsed coherent beam of electromagnetic radiation containing energy in a preselected wavelength is emitted. The preselected wavelength corresponds to an allowable energy transition for the particular optically orientable medium selected.

Figure 2:
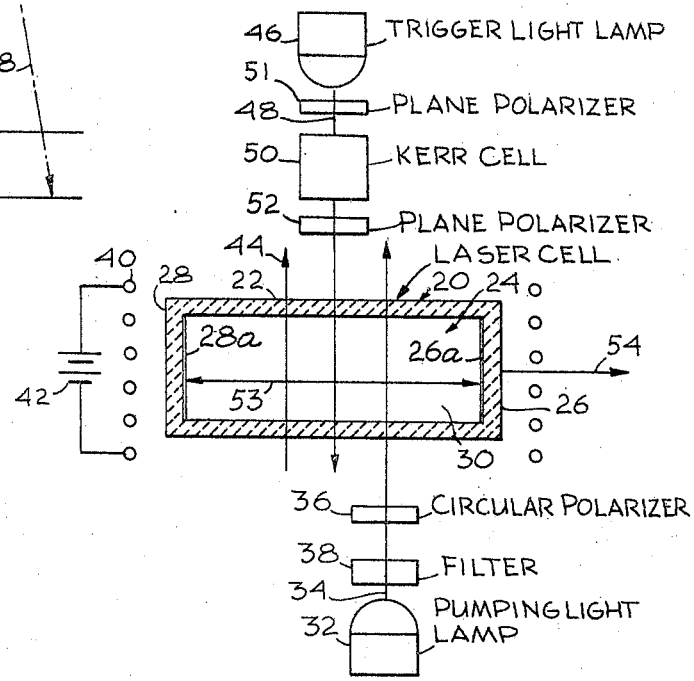
FIGURE 2 is a schematic representation of the structure associated with one embodiment of applicant's invention.

Referring to FIGURE 2 there is shown a semi-diagrammatic representation of one embodiment of applicant's invention. A generally cylindrical laser cell 20 has cylindrical wall portions 22 defining a cavity 24. The cylindrical wall portions 22 may be fabricated of a material that is transparent to preselected wavelengths of electromagnetic radiation. Such materials may include glass, quartz or the like. The laser cell 20 is closed by a pair of oppositely-disposed wall portions 26 and 28, which may also be fabricated of glass, quartz, or the like, that are spaced a preselected distance apart. The wall portions 26 and 28 are coupled to the cylindrical portions 22 and seal the cavity 24.

Surfaces 26a and 28a of the oppositely-disposed wall portions 26 and 28 are reflective of at least one preselected wavelength of electromagnetic radiation. Thus, these surfaces 26a and 28a comprise surfaces for internal reflection of electromagnetic radiation in the cavity 24. The surface 26a is made, or has a portion thereof, that is, partially transparent to the preselected wavelength of electromagnetic radiation for which it is also reflective. Thus, electromagnetic radiation of this preselected wavelength that is generated in the cavity 24 can escape through the partially transparent internal surface 26a of wall portion 26. The spacing of the wall portions 26 and 28 to provide a preselected separation between the internally reflecting surfaces 26a and 28a is dependent upon the particular wavelength of desired laser emission and, in general, is a multiple of this wavelength.

An optically orientable medium 30 is contained within the cavity 24. For purposes of illustration, the optically orientable medium 30 may be considered to be the isotope 199 of mercury. The optically orientable medium 30 is thus comprised of a plurality of particles which are the atoms of the mercury 199 in a gaseous state maintained in the cavity 24 at a preselectel pressure and temperature. Applicant has found, for example, that a pressure of approximately $10^{-4}$ mm. of mercury absolute and a temperature of 0° C. is satisfactory for maintaining the gaseous atoms of mercury 199 in the cavity 24. It is preferable, in applicant's invention, that the pressure at which the optically orientable medium 30 is maintained be less than that wherein there will be a trapping of resonance radiation which would tend to decrease the laser output of applicant's invention. Suitable temperature controlling means (not shown) may be incorporated with applicant's invention to maintain the optically orientable medium 30 at the preselected temperature.

An optical pumping light lamp 32 is adapted to emit a beam of optical pumping light indicated by the arrow 34. The optical pumping light 34 contains energy in a wavelength corresponding to an allowable energy transition between energy levels of the optical orientable medium 30. For mercury 199 as the optically orientable medium 30, applicant has found that a mercury lamp utilizing emission obtained from the isotope 199 or the isotope 204 of mercury contains energy in a desired wavelength. The optical pumping light 34 passes through a circular polarizer 36 which circularly polarizes the optical pumping light beam 34, through the wall portions 22 of the laser cell 20 and irradiates the optically orientable medium 30. In irradiating the optical orientable medium 30, the optical pumping light beam 34 induces therein preselected energy transitions between preselected energy levels of the optically orientable medium 30. For mercury 199 the optical pumping light beam 34 contains energy of 2537 angstroms and the preselected energy transitions correspond to the transitions first from the $m_f = -\frac{1}{2}$ magnetic substate of the $S_0$ ground state up to the $m_f = +\frac{1}{2}$ magnetic substate of the $P_1$ first optically excited state, and then by spontaneous decay from the $m_f = +\frac{1}{2}$ magnetic substate of the $P_1$ first optically excited state down to the $m_f = -\frac{1}{2}$ magnetic substate of the $S_0$ ground state. Both these steps are induced as a result of the irradiation of the optically orientable medium 30 by the circularly polarized optical pumping light beam 34.

In some applications it may be desirable to include a filter means 38 in the path of the optical pumping light beam 34 to eliminate undesirable wavelengths of electromagnetic radiation which would tend to either depump the optically orientable medium 30 or induce extraneous and undesired energy transitions therein.

Also, a coil means 40 powered by the direct current source of electrical energy such as the battery 42 may be included to generate a unidirectional magnetic field in regions containing the optically orientable medium 30, designated by the arrow 44. The unidirectional magnetic field 44 may be required to aid in the Zeeman splitting of the optically orientable medium 30 into the degenerate magnetic substates.

A trigger light lamp 46 is adapted to emit a beam of trigger light indicated by the arrow 48. Applicant has found that the trigger light lamp may be similar to the pumping light lamp 32 and may utilize the emission obtained from the isotopes 199 or 204 of mercury to generate the trigger light beam 48. The trigger light beam 48 passes through a Kerr cell 50, of well-known design, such as disclosed in the Encyclopaedic Dictionary of Physics, volume 4, page 160, which operates as an electronic shutter to cyclically transmit the trigger light beam 48 to the laser cell 20. Since the Kerr cell 50 requires plane polarized electromagnetic radiation for proper operation, the trigger light beam 48 passes through a first plane polarizer 51 before entering the Kerr cell 50. After leaving the Kerr cell 50 the trigger light beam 48 may, if desired, be transmitted through a second plane polarizer means 52 which plane polarizes the trigger light beam 48. However, the trigger light beam 48 may be left unpolarized after leaving the Kerr cell 50. Trigger light beam 48 then passes through the walls 22 of the laser cell 20 and irradiates the optically alignable medium 30. The trigger light beam 48 contains energy in a wavelength of electromagnetic radiation that is required to induce a preselected energy transition of the optically aligned optically orientable medium 30, the alignment having been obtained by the pumping action of the optical pumping light beam 34.

For mercury 199 as the optically orientable medium 30 the trigger light beam 48 contains energy in a wavelength of 2537 angstroms, the same wavelength that is included in the optical pumping light beam 34.

The trigger light beam 48 cyclically induces energy transitions of the mercury 199 atoms in the medium 30 from the $m_f = +\frac{1}{2}$ magnetic substate of the $S_0$ ground state up to the $m_f = +\frac{1}{2}$ magnetic substate of the $P_1$ first optically excited state. Since virtually all of the atoms of mercury 199 were previously aligned in the $m_f = +\frac{1}{2}$ magnetic substate of the $S_0$ ground state, the trigger light beam 48 cyclically induces an overpopulation of the $m_f = +\frac{1}{2}$ magnetic substate of the $P_1$ first optically excited state. This provides a population inversion of this state with respect to the $m_f = -\frac{1}{2}$ magnetic substate of the $S_0$ ground state. These atoms of mercury 199 comprising the optically orientable medium 30 then undergo a spontaneous decay from the $m_f = +\frac{1}{2}$ magnetic substate of the $P_1$ first optically excited state down to the $m_f = -\frac{1}{2}$ magnetic substate of the $S_0$ ground state and in this energy transition electromagnetic radiation having energy in the wavelength 2537 angstroms is emitted therefrom.

This emission is isotropic. However, a certain amount of the electromagnetic radiation is emitted in a direction perpendicular to the oppositely-disposed wall portions 26 and 28 of the laser cell 20 and therefore is internally reflected in the cavity 24. This reflection back and forth between the reflective surfaces 26a and 28a, indicated by arrow 53, stimulates the emission of electromagnetic radiation at the wavelength of 2537 angstroms in a direction perpendicular to the surfaces 26a and 28a. A part of this reflecting electromagnetic radiation is emited from the laser cell 20 through the partially transparent surface 26a, as indicated by the arrow 54. This emission 54 is the coherent electromagnetic laser beam and ceases when there no longer exists a sufficient poppulation inversion between the above two stated magnetic substates of the mercury 199.

It will be appreciated that when optically orientable mediums other than mercury 199 are utilized as the optically orientable medium 30, the designation of the particular wavelengths, magnetic substates, energy levels, ground states and optically excited states will be different. However, those skilled in the art will be cognizant of the particular quantum energy designations and wavelengths associated therewith for a given optically orientable medium 30.

From the above it can be seen that the operation of applicant's improved laser is cyclic: that is, the laser electromagnetic radiation 54 is only cyclically emitted from the laser cell 20, and the trigger light beam 48 irradiation is cyclically terminated. FIGURE 3 and FIGURES 4a through 4d illustrate the operational characteristics of the embodiment of applicant's laser illustrated on FIGURE 2.

Figure 3:
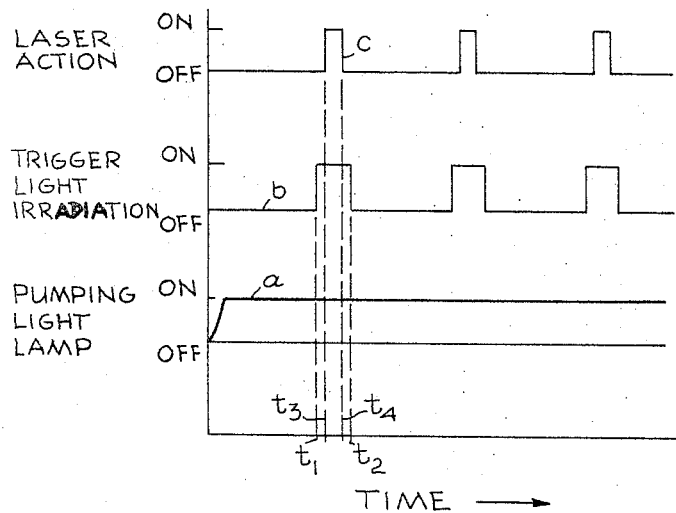

As shown on curve a of FIGURE 3, the pumping light lamp 32 is initially turned "ON" and may be left on throughout the operation of applicant's laser illustrated on FIGURE 2. There is no necessity for cyclically terminating the optical pumping light beam 34, as this particular radiation does not interfere with the operation of applicant's laser during the laser emission thereof.

The trigger light 48 irradiation of the optically orientable medium 30 is cyclic in nature, as indicated by curve b of FIGURE 3. As described above, this is achieved by the operation of the Kerr cell 50 and at time $t_1$ the Kerr cell 50 allows the trigger light beam 48 to irradiate the optically orientable medium 30. This irradiation continues until time $t_2$. To achieve the proper trigger light action it is desired that the trigger light beam 48 be intense.

After the trigger light beam starts irradiating the optically orientable medium 30 and the above-described energy transitions take place, laser action is initiated by the stimulated emission of electromagnetic radiation as indicated on curve c of FIGURE 3. Laser action starts at time $t_3$ and continues until time $t_4$ when there is an insufficient population inversion between the above-described energy levels to support the stimulated emission of radiation. After the laser emission is terminated the action of the continuously irradiating optical pumping light beam 34 again realigns the particles comprising the optically orientable medium 30 as described above and further cyclic irradiation by the trigger light beam 48 will repeat the above-described cycle.

FIGURES 4a through 4d shows a diagrammatic representation of the relative population of the selected energy states of mercury 199 utilized as the medium 30 during operation of the embodiment of applicant's invention shown on FIGURE 2. In FIGURE 4a there is seen to be a virtually equal population distribution of the atoms of mercury 199, indicated by the circles 56, in both the $m_f=+\frac{1}{2}$ and the $m_f=-\frac{1}{2}$ magnetic substates of the $S_0$ ground state. At this time there are, for all practical purposes, no atoms in the $P_1$ excited state. FIGURE 4b illustrates the population distribution during the process of optical pumping by the optical pumping light beam 34. At this time there are only a few of the atoms remaining in the $m_f=-\frac{1}{2}$ magnetic substate of the $S_0$ ground state and a few more at the $m_f=+\frac{1}{2}$ magnetic substate of the $P_1$ excited state: the majority of atoms have already been aligned into the $m_f=+\frac{1}{2}$ magnetic substate of the $S_0$ ground state after being pumped up to the $P_1$ excited state and then spontaneously decaying back to this magnetic substate.

FIGURE 4c shows almost complete alignment of virtually all the atoms in the $m_f=+\frac{1}{2}$ magnetic substate of the $S_0$ ground state, which condition is achieved in the two-step optical pumping by the optical pumping light beam 34. This condition shown on FIGURE 4c exists immediately prior to the irradiation of the medium 30 by trigger light beam 48.

FIGURE 4d shows the population distribution after the irradiation by the trigger light beam 48 and before spontaneous decay has occurred. As seen virtually all the atoms have been induced to undergo an energy transition from the $m_f=+\frac{1}{2}$ magnetic substate of the $S_0$ ground state up to the $m_f=+\frac{1}{2}$ magnetic substate of the $P_1$ first optically excited state. From this condition shown in FIGURE 4d, there is the spontaneous decay down to the $m_f=-\frac{1}{2}$ magnetic substate of the $S_0$ ground state with the consequent emission of electromagnetic radiation at a wavelength of 2537 angstroms.

As discussed above, applicant has also found that materials other than gaseous atoms may be utilized as his optically orientable medium in the practice of his invention herein. FIGURE 5 shows the structure associated with an embodiment of applicant's invention of a laser cell comprised of a solid. As shown, the laser cell 60 comprises a solid rod of silicon in which there is distributed impurities comprising atoms of, for example, arsenic. Ends 62 and 64 of the rod 60 are reflectively coated to provide internal reflection of electromagnetic radiation indicated by the arrow 66 that is generated within the cell 60. The end 64 may be partially transparent to the electromagnetic radiation 66 to allow a portion thereof to escape from the cell 60 indicated by the arrow 68. The cell 60 would replace the laser cell 20 shown in the embodiment of FIGURE 2 and may be subjected to suitable optical pumping light beam irradiation (not shown in FIGURE 5) and suitable cyclical trigger light beam irradiation (not shown in FIGURE 5). The atoms of arsenic contained within the cell 60 react in a manner similar to that described above for the optically orientable medium 30 in the embodiment shown on FIGURE 2 when the atoms of arsenic are subjected to the above-described optical pumping electromagnetic radiation and trigger light electromagnetic radiation.

Applicant has also found that a laser cell not incorporating internally reflective end portions may also be utilized in the practice of his invention. For example, for a gaseous optically orientable medium the laser cell may be fabricated with a sufficient length of cavity so that stimulated emissions will occur from the amount of naturally occurring spontaneous energy decays in a direction parallel to the length of the tube.

A solid laser cell, as shown on FIGURE 5, may also be fabricated in sufficient length to achieve the same function. In both instances the length selected is dependent upon consideration of the particular optically orientable medium selected and the wavelength of the laser emission.

In the operation of applicant's invention herein the optically orientable medium is only cyclically subjected to the trigger light beam. Applicant has found that the trigger light beam is preferably intense and further, need not be limited to containing energy in only the wavelength required to effect the desired energy transition of the optically orientable medium. That is, as long as the trigger light beam is intense and does contain at least some energy in the desired wavelength to achieve the preselected energy transition, it will operate satisfactorily as the trigger light beam. Thus, "white" light, which contains energy in a continuous band of wavelengths may be utilized as the trigger light beam if it is sufficiently intense in the desired wavelength. In obtaining such a beam of white light applicant has found that essentially "black body" radiation may be utilized. Such a high intensity of black body radiation may be achieved by the structure illustrated on FIGURE 6.

As shown on FIGURE 6, there is a schematic representation of a trigger light beam generating means generally designated 70 that emits electromagnetic radiation from an exploding wire. Thus, a source of elctrical energy 72 is connected through a rheostat 74 to a pair of electrodes 76 and 78. Electrodes 76 and 78 are insulated from each other by a dielectric 80. A wire means 82 from spool 85 is cyclically positioned to contact electrode 76 and a breakdown dielectric 84 coupled to the electrode 78. When the wire 82 is thus positioned, the voltage between the electrodes 78 and 76 may be progressively increased by operation of the rheostat 74 until the breakdown voltage of the breakdown dielectric 84 is reached at which time there will be a sudden continuous circuit between the electrode 78 and the electrode 76 through wire means 82. This voltage is selected as one that is sufficient to explode the wire 82, as opposed to just melting it, in accordance with the known techniques of exploding wires. The exploding wire emits substantially black body electromagnetic radiation indicated by the arrow 86 which may be utilized as the trigger light beam in applicant's invention herein.

Similarly, applicant has also found that a plasma may be utilized to provide the trigger light beam, as the electromagnetic radiation emitted from a plasma is equivalent to a black body at tens of thousands of degrees centigrade. The plasma is cyclically operable by nature and can provide the high intensity cyclic trigger light beam desired for the operation of applicant's invention herein.

In addition, if a continuous light source is utilized as the source of the trigger light beam, applicant has found that a mechanical chopper may be satisfactorily utilized to provide the cyclic irradiation of the optically orientable medium in applicant's invention.

It can therefore be seen that applicant has provided an improved laser that allows utilization of a variety of materials to provide a source of laser emission. Applicant's invention thus permits the generation of a pulsed coherent beam of electromagnetic radiation in many different wavelengths of electromagnetic radiation. Further, applicant's invention permits the construction of a laser that is more economical to fabricate and operate than lasers previously known.

Those skilled in the art will find many adaptations and variations of applicant's invention. Therefore, the appended claims are intended to cover all such variations and adaptations falling within the true scope and spirit of this invention.

What is claimed is:

1. In a pulsed laser of the type which emits a pulsed, coherent beam of electromagnetic radiation, the improvement comprising, in combination:

an optically orientable medium comprising a plurality of particles having predetermined allowable energy levels;

means for generating a beam of electromagnetic radiation having energy in a preselected wavelength and positioned to irradiate said medium with said beam of electromagnetic radiation to induce energy transitions of said particles from a first energy level to a second energy level different from said first energy level;

means for inducing energy transitions of said particles from said second energy level to a third energy level higher than said first and said second energy levels; and means for inducing a stimulated energy transition of said particles from said third energy level to said first energy level whereby a coherent beam of electromagnetic radiation having energy in wavelength corresponding to the energy difference between said third energy level and said first energy level is emitted from said medium.

2. In a pulsed laser of the type which emits a pulsed, coherent beam of electromagnetic radiation, the improvement comprising, in combination:

an optically orientable medium comprising a plurality of particles having predetermined allowable energy levels;

optical pumping light generating means for generating a beam of optical pumping electromagnetic radiation having energy in a wavelength corresponding to the energy separation between a first preselected energy level of said particles and a second preselected energy level higher than said first preselected energy level of said particles;

means for irradiating said medium with said beam of optical pumping electromagnetic radiation to induce energy transitions of said particles from said first preselected energy level to said second preselected energy level;

means for inducing a spontaneous decay of said particles from said second preselected energy level to a third preselected energy level less than said second preselected energy level whereby there are substantially more of said particles in said third energy level than in said first energy level;

cyclically operable trigger light generating means for generating a trigger light beam of electromagnetic radiation having energy in a wavelength corresponding to the energy separation between said third preselected energy level and said second preselected energy level of said particles;

means for irradiating said medium with said trigger light beam to induce a substantially simultaneous energy transition of said particles from said third preselected energy level to said second preselected energy level; and means for inducing stimulated energy transitions of said particles from said second preselected energy level to said first preselected energy level whereby a pulse of coherent electromagnetic radiation having energy in a wavelength corresponding to the energy difference between said second preselected energy level and said first preselected energy level is emitted from said medium.

3. The arrangement defined in claim 2 wherein said cyclically operable trigger light generating means comprises a cyclically operable exploding wire meanrs.

4. The arrangement defined in claim 2 wherein said cyclically operable trigger light generating means comprises a cyclically operable plasma means.

5. In a pulsed laser of the type which emits a pulsed, coherent beam of electromagnetic radiation, the improvement comprising, in combination:

a laser cell having walls defining a cavity and a first portion of said walls transparent to preselected wavelengths of electromagnetic radiation and a second portion of said walls comprising a pair of flat, oppositely-disposed wall sections in a predetermined spaced relationship, having surfaces internally reflective of a preselected wavelength of electromagnetic radiation, and one of said wall sections having at least a portion partially transparent to said preselected wavelength of electromagnetic radiation;

an optically orientable medium comprising a plurality of particles contained within said cavity and having predetermined allowable energy levels;

magnetic field generating means for generating a weak unidirectional magnetic field in regions containing said medium in a first direction;

an optical pumping lamp for generating an optical pumping light beam;

means for circularly polarizing said optical pumping light beam;

means for irradiating said medium with said circularly polarized optical pumping light beam in said first direction to induce energy transition of said particles from a first preselected energy level to a second preselected energy level higher than said first preselected energy level;

trigger light generating means for generating an intense beam of trigger light electromagnetic radiation;

plane polarizer means intermediate said trigger light generating means and said medium for plane polarizing said trigger light beam with the plane of polarization parallel to said first direction;

means for cyclically operating said trigger light generating means; and means for irradiating said medium with said plane polarized trigger light beam in a direction parallel to said first direction to induce energy transitions of said particles from said second preselected energy level to a third preselected energy level higher than said first and said second preselected energy levels whereby a population inversion of said particles is induced between said third preselected energy level and said first preselected energy level and said particles undergo a stimulated energy transition from said third preselected energy level to said first preselected energy level and electromagnetic radiation is emitted from said medium through said partially transparent portion of said wall section.

6. In a pulsed laser of the type which emits a pulsed coherent beam ol electromagnetic radiation, the improvement comprising, in combination:

a laser cell having walls defining a cavity and a first portion of said walls transparent to preselected wavelengths of electromagnetic radiation and a second portion of said walls comprising a pair of flat oppositely-disposed wall sections in a predetermined spaced relationship and having surfaces internally reflective of a preselected wavelength of electromagnetic radiation, and one of said wall sections having at least a portion partially transparent to said preselected wavelength of electromagnetic radiation;

an optically orientable medium comprising a plurality of particles contained within said cavity and having predetermined allowable energy levels;

an optical pumping lamp for generating an optical pumping light beam of electromagnetic radiation;

means for circularly polarizing said optical pumping light beam;

means for irradiating said medium with said circularly polarized optical pumping beam to induce energy transitions of said particles from a first preselected energy level to a second preselected energy level higher than said first preselected energy level;

trigger light generating means for generating an intense beam of electromagnetic radiation;

means for cyclically operating said trigger light generating means; and means for irradiating said medium with said beam of electromagnetic radiation to induce energy transitions of said particles from said second preselected energy level to a third preselected energy level higher than said first and said second preselected energy levels whereby a population inversion of said particles is induced between said third preselected energy level and said first preselected energy level and said particles undergo a stimulated energy transition from said third preselected energy level to said first preselected energy level and electromagnetic radiation is emitted from said medium through said partially transparent wall portion of said wall section.

7. In a pulsed laser of the type which emits a pulsed coherent beam of electromagnetic radiation, the improvement comprising, in combination:

a laser cell having walls defining a cavity and a first portion of said walls transparent to preselected wavelengths of electromagnetic radiation and a second portion of said walls comprising a pair of flat oppositely-disposed wall sections in a predetermined spaced relationship having surfaces internally reflective of a preselected wavelength of electromagnetic radiation, and one of said wall sections having at least a portion partially transparent to said preselected wavelength of electromagnetic radiation;

an optically orientable medium comprising a plurality of particles contained within said cavity and having predetermined allowable energy levels;

magnetic field generating means for generating a weak unidirectional magnetic field in regions containing said medium in a first direction;

means for irradiating said medium with a circularly polarized optical pumping light beam to induce energy transitions of said particles from said first preselected energy level to a second preselected energy level higher than said first preselected energy level;

trigger light generating means for generating a trigger light comprising an intense beam of electromagnetic radiation;

plane polarizer means intermediate said trigger light generating means and said medium for plane polarizing said trigger light beam; and means for cyclically irradiating said medium with said plane polarized trigger light to induce energy transitions of said particles from said second preselected energy level to a third preselected energy level higher than said first and said second preselected energy levels.

8. In a pulsed laser of the type which emits a pulsed coherent beam of electromagnetic radiation, the improvement comprising, in combination:

a laser cell having walls defining a cavity and a first portion of said walls transparent to preselected wavelengths of electromagnetic radiation and a second portion of said walls comprising a pair of flat oppositely-disposed wall sections in a predetermined spaced relationship having surfaces internally reflective of a preselected wavelength of electromagnetic radiation, and one of said wall sections having at least a portion partially transparent to said preselected wavelength of electromagnetic radiation;

an optically orientable medium comprising a plurality of particles contained within said cavity and having predetermined allowable energy levels;

means for irradiating said medium with a circularly polarized optical pumping light beam to induce energy transitions of said particles from said first preselected energy level to a second preselected energy level higher than said first preselected energy level;

trigger light generating means for generating an intense beam of trigger light electromagnetic radiation; and means for cyclically irradiating said medium with said trigger light to induce energy transitions of said particles from said second preselected energy level to a third preselected energy level higher than said first and said second preselected energy levels.

9. In a pulsed laser of the type which emits a pulsed coherent beam of electromagnetic radiation, the improvement comprising in combination:

a laser cell having walls defining a cavity and a first portion of said walls transparent to preselected wavelengths of electromagetic radiation and a second portion of said walls comprising a pair of flat oppositely-disposed wall sections in a predetermined spaced relationship having surfaces internally reflective of a preselected wavelength of electromagnetic radiation, and one of said wall sections having at least a portion partially transparent to said preselected wavelength of electromagnetic radiation;

an optically orientable medium comprising a collection of atoms of an isotope selected from the group consisting of: hydrogen, mercury, sodium, potassium, lithium, rubidium, calcium, cadmium, magnesium and cesium;

magnetic field generating means for generating a weak unidirectional magnetic field in regions containing said medium in a first direction;

an optical pumping lamp for generating an optical pumping light beam;

means for circularly polarizing said optical pumping light beam;

means for irradiating said medium with said circularly polarized optical pumping light beam to induce energy transitions of said atoms from a first preselected energy level to a second preselected energy level higher than said first preselected energy level;

trigger light generating means for generating an intense beam of trigger light electromagnetic radiation;

plane polarizer means intermediate said trigger light generating means and said medium for plane polarizing said trigger light beam with the plane of polarization parallel to said first direction; and means for cyclically irradiating said medium with said plane polarized trigger light beam to induce energy transitions of said atoms from said second preselected energy level to a third preselected energy level higher than said first and second preselected energy levels whereby a population inversion of said atoms is induced between said third preselected energy level and said first preselected energy level and said atoms undergo a stimulated energy transition from said third preselected energy level to said first preselected energy level.

10. In a pulsed laser of the type which emits a pulsed coherent beam of electromagnetic radiation, the improvement comprising, in combination:

a laser cell having walls defining a cavity and a first portion of said walls transparent to preselected wavelengths of electromagnetic radiation and a second portion of said walls comprising a pair of flat oppositely-disposed wall sections in a predetermined spaced relationship having surfaces internally reflective of a preselected wavelength of electromagnetic radiation, and one of said wall sections having at least a portion partially transparent to said preselected wavelength of electromagnetic radiation;

an optically orientable medium comprising a collection of atoms of an isotope selected from the group consisting of: hydrogen, mercury, sodium, potassium, lithium, rubidium, calcium, cadmium, magnesium and cesium;

means for generating an optical pumping light beam;

means for circularly polarizing said optical pumping light beam;

means for irradiating said medium with said circularly polarized optical pumping beam to induce energy transitions of said atoms from a first preselected energy level to a second preselected energy level higher said first preselected energy level;

trigger light generating means for generating an intense beam of trigger light electromagnetic radiation;

means for cyclically operating said trigger light generating means; and means for irradiating said medium with said trigger light beam to induce energy transition of said atoms from said second preselected energy level to a third preselected energy level higher than said first and said second preselected energy levels whereby a population inversion of said atoms is induced between said third preselected energy level and said first preselected energy level and said atoms undergo a stimulated energy transition from said third preselected energy level to said first preselected energy level.

11. In a pulsed laser of the type which emits a pulsed coherent beam of electromagnetic radiation, the improvement comprising, in combination:

a laser cell having walls defining a cavity and a first portion of said walls transparent to preselected wavelengths of electromagnetic radiation and a second portion of said walls comprising a pair of flat oppositely-disposed wall sections having surfaces internally reflective of a preselected wavelength of electromagnetic radiation, and one of said wall sections having at least a portion partially transparent to said preselected wavelength of electromagnetic radiation;

an optically orientable medium comprising a plurality of particles contained within said cavity and having predetermined allowable energy levels;

magnetic field generating means for generating a weak unidirectional magnetic field in regions containing said medium in a first direction;

an optical pumping lamp for generating an optical pumping light beam;

means for circularly polarizing said optical pumping light beam;

means for irradiating said medium with said circularly polarized optical pumping beam to induce energy transitions of said particles from a first preselected energy level to a second preselected energy level higher than said first preselected energy level;

a trigger lamp for emitting a beam of trigger light;

a first plane polarizer means intermediate said trigger lamp and said laser cell for plane polarizing said trigger light beam; and a Kerr cell for receiving said plane polarized trigger light beam and cyclically transmit said trigger light beam to said medium, a second plane polarizer means intermediate said Kerr cell and said medium for plane polarizing said trigger light beam emitted from said Kerr cell to induce energy transitions of said particles from said second preselected energy level to a third preselected energy level higher than said first and said second preselected energy levels whereby a population inversion of said particles is induced between said third preselected energy level and said first preselected energy level.

12. In a pulsed laser of the type which emits a pulsed coherent beam of electromagnetic radiation, the improvement comprising, in combination:

a laser cell having walls defining a cavity and a first portion of said walls transparent to preselected wavelengths of electromagnetic radiation and a second portion of said walls comprising a pair of flat oppositely-disposed wall sections in a preselected spaced relationship internally reflective of a preselected wavelength of electromagnetic radiation, and one of said wall sections having at least a portion partially transparent to said preselected wavelength of electromagnetic radiation;

an optically orientable medium comprising a plurality of particles contained within said cavity and having predetermined allowable energy levels;

means for irradiating said medium with a circularly polarized optical pumping light beam to induce energy transitions of said particles from a first preselected energy level to a second preselected energy level higher than said first preselected energy level;

a trigger lamp for emitting a beam of trigger light;

a plane polarizer means intermediate said trigger lamp and said laser cell for plane polarizing said trigger light beam; and a Kerr cell for receiving said plane polarized trigger light beam and cyclically transmit said plane polarized trigger light beam to said medium, a second plane polarizer means intermediate said Kerr cell and said medium for plane polarizing said trigger light beam emitted from said Kerr cell to induce energy transitions of said particles from said second preselected energy level to a third preselected energy level higher than said first and said second preselected energy levels.

13. In a pulsed laser of the type which emits a pulsed coherent beam of electromagnetic radiation, the improvement comprising, in combination:

an optically orientable medium comprising a plurality of particles having predetermined allowable energy levels;

magnetic field generating means for generating a weak unidirectional magnetic field in regions containing said medium in a first direction;

means for irradiating said medium with a circularly polarized optical pumping light beam to induce energy transitions of said particles from a first preselected energy level to a second preselected energy level higher than said first preselected energy level;

a trigger light generating means comprising a cyclically operable exploding wire means for emitting high intensity electromagnetic radiation;

means for irradiating said medium with said electromagnetic radiation to induce energy transitions of said particles from said second preselected energy level to a third preselected energy level higher than said first and said second preselected energy levels; and means for inducing a stimulated energy transition from said third preselected energy level to said first preselected energy level whereby electromagnetic radiation having energy in a wavelength corresponding to the energy difference between said third and said first preselected energy levels is cyclically emitted from said medium.

14. In a pulsed laser of the type which emits a pulsed coherent beam of electromagnetic radiation, the improvement comprising, in combination:

an optically orientable medium comprising a plurality of particles having predetermined allowable energy levels;

magnetic field generating means for generating a weak unidirectional magnetic tfield in regions containing said medium in a first direction;

means for irradiating said medium with a circularly polarized optical pumping light beam to induce energy transitions of said particles from a first preselected energy level to a second preselected energy level higher than said first preselected energy level;

a trigger light generating means comprising a cyclically operable plasma means for emitting high intensity electromagnetic radiations;

means for irradiating said medium with electromagnetic radiation to induce energy transitions from said second preselected energy level to a third preselected energy level higher than said first and said second preselected energy levels whereby a population inversion of said particles is induced between said third preselected energy level and said first preselected energy level; and means for inducing a stimulated energy transition from said third preselected energy level to said first preselected energy level whereby electromagnetic radiation having energy in a wavelength corresponding to the energy difference between said third and said first preselected energy levels is cyclically emitted from said medium.

15. A method of operating a pulsed laser to obtain a preselected wavelength of electromagnetic radiation from an optically orientable medium comprising the steps of:

subjecting the medium to a circularly polarized optical pumping light beam having energy in the preselected wavelength;

cyclically subjecting the medium to a high intensity beam of plane polarized electromagnetic radiation having energy in said preselected wavelength; and inducing stimulated electromagnetic radiation emission from said medium at said preselected wavelength.

16. A method of operating a pulsed laser comprising the steps of:

subjecting an optically orientable medium to a first beam of electromagnetic radiation to induce an overpopulation of the particles comprising said medium in a first energy level of the ground state of the medium with respect to a second energy level of the ground state of the medium; and cyclically subjecting the medium to a second beam of electromagnetic radiation to induce a cyclical overpopulation of the particles comprising the medium in an energy level of an excited state with respect to the second energy level of the ground energy state.

17. A method of operating a pulsed laser comprising the steps of:

generating an optical pumping light beam;

circularly polariziing the optical pumping light beam;

irradiating an optically orientable medium with said circularly polarized optical pumping light beam;

generating a trigger light beam;

cyclically subjecting said medium to said trigger light beam; and extracting a beam of coherent electromagnetic radiation from said optically orientable medium.

18. A method of operating a pulsed laser of the type in which a coherent beam of electromagnetic radiation is emitted from an optically orientable medium comprising the steps of:

optically pumping the said optically orientable medium to induce an overpopulation of the particles comprising said medium in a first preselected energy state;

generating a trigger light beam;

cyclically subjecting the medium to said trigger light beam to induce a transition of the particules from said first preselected energy state to a second preselected energy state;

inducing a stimulated decay of the particles from said second preselected energy state to a third preselected energy state; and extracting a coherent beam of electromagnetic radiation from the medium.

19. In a pulsed laser of the type which emits a pulsed coherent beam of electromagnetic radiation from an optically orientable medium, the improvement comprising, in combination:

means for establishing a first preselected population distribution between the allowable energy states of said medium;

means for establishing a second population distribution different from said first population distribution between the allowable energy states of said medium;

means for inducing a stimulated decay of the particles comprising said medium from said second preselected population distribution to a third preselected population distribution, different from said second preselected population distribution, between the energy states of said medium; and means for extracting a coherent beam of electromagnetic radiation in a preselected wavelength.

20. In a pulsed laser of the type in which an optically orientable medium comprising a plurality of particles is optically pumped to establish a preselected energy distribution of the particles wherein there is a greater number of said particles in a first preselected energy level of the ground energy state of said particles than in a second preselected energy level of the ground energy state of said particles, the improvement comprising:

means for establishing a population inversion of said particles in a third energy level of an excited state of said particles, said third energy level being higher than said first and said second energy levels, with respect to said second energy level at said ground energy state of said particles;

means for inducing a stimulated decay of said particles from said third energy level to said first energy level; and means for extracting from said medium a coherent beam of electromagnetic radiation having a wavelength corresponding to the difference between said third energy level and said second energy level.

21. In a pulsed laser of the type in which an optically orientable medium comprising a plurality of particles is optically pumped to establish a preselected energy distribution of the particles wherein there is a greater number of said particles in a first preselected energy level of the ground energy state of said particles than in a second preselected energy level of the ground energy state of said particles, the improvement comprising:

means for generating an intense beam of electromagnetic radiation containing energy in a preselected wavelength corresponding to the energy separation between said first energy level at said ground energy state of said particles and a third energy level at an excited energy state of said particles;

means for cyclically irradiating said medium with said beam of electromagnetic radiation whereby an overpopulation of said third energy level with respect to said first energy level is obtained;

means for inducing a stimulated energy transition of said particles from said third energy level to said second energy level; and means for extracting a coherent beam of electromagnetic radiation from the medium having a wavelength corresponding to the energy separation between said third energy level and said second energy level.

22. A method of operating a pulsed laser of the type in which an optically orientable medium comprising a plurality of particles is first subjected to optical pumping electromagnetic radiation to achieve a first preselected population distribution between allowable energy levels of said medium and then the medium is subjected to an intense beam of electromagnetic radiation to induce a second preselected population distribution of the particles between the allowable energy states of said medium and in which a stimulated decay of said particles from said second population energy distribution to a third population distribution is induced and electromagnetic radiation is emitted from said medium in said induced transition of said particles from said second population distribution to said third population distribution, the improvement comprising:

utilizing as an optically orientable medium an isotope selected from the group consisting of helium, mercury, cesium, sodium, potassium, rubidium, calcium cadmium and magnesium.

23. In a pulsed laser of the type which emits a pulsed, coherent beam of electromagnetic radiation, the improvement comprising, in combination:

an optically orientable medium comprising a plurality of particles having predetermined allowable energy levels;

means for generating a beam of electromagnetic radiation having energy in a first preselected wavelength and positioned to radiate said medium with said beam of electromagnetic radiation to induce energy transitions of said particles from a first energy level to a second energy level different from said first energy state;

means for cyclically inducing energy transitions of said particles from said second energy state to a third energy level higher than said first and said second energy states;

means for inducing a stimulated energy transition of said particles from said third energy state to said first energy level whereby electromagnetic radiation having energy in a second regulated wavelength corresponding to the energy difference between said third energy level and said first energy level is emitted from said medium; and means for cyclically inducing the emission of a coherent beam of electromagnetic radiation having energy in said second preselected wavelength from said medium.

24. In a pulsed laser of the type which emits a pulsed, coherent beam of electromagnetic radiation, the improvement comprising, in combination:

an optically orientable medium comprising a plurality of particles having predetermined allowable energy states;

optical pumping light generating means for generating a beam of optical pumping electromagnetic radiation having energy in a wavelength corresponding to the energy separation between a first preselected energy level of said particles and a second preselected energy level higher than said first preselected energy level of said particles;

means for irradiating said medium with said beam of optical pumping electromagnetic radiation to induce energy transitions of said particles from said first preselected energy level to said second preselected energy level;

means for inducing a spontaneous decay of said particles from said second preselected energy level to a third preselected energy level less than said second preselected energy level whereby there are substantially more of said particles in said third energy level than in said first energy level;

cyclically operable trigger light generating means for generating a trigger light beam of electromagnetic radiation having energy in a wavelength corresponding to the energy separation between said third preselected energy level and said second preselected energy level of said particles;

means for cyclically irradiating said medium with said trigger light beam to induce a substantially simultaneous energy transition of said particles from said third preselected energy level to said second preselected energy level;

means for cyclically inducing stimulated energy transitions of said particles from said second preselected energy level to said first preselected energy level; and means for cyclically inducing the emission of a coherent electromagnetic radiation having energy in a wavelength corresponding to the energy difference between said second preselected energy level and said first preselected energy level.

References Cited

UNITED STATES PATENTS

| | | | |
|---|---|---|---|
| 3,102,920 | 9/1963 | Sirons | 331—94.5 |
| 3,211,055 | 10/1965 | Andres | 331—94.5 X |
| 3,178,657 | 4/1965 | Morse | 331—94.5 |

OTHER REFERENCES

Stevenson et al: "Exploding Wires as Pumping Sources for Optical Masers," Bull., Amer. Phys. Soc., vol. 7, No. 3, p. 195, Mar. 26, 1962, QC1A58.

JEWELL H. PEDERSEN, *Primary Examiner.*

E. BAUER, *Assistant Examiner.*

U.S. Cl. X.R.

313—46